US006275392B1

United States Patent
Streicher et al.

(10) Patent No.: US 6,275,392 B1
(45) Date of Patent: Aug. 14, 2001

(54) METHOD AND APPARATUS FOR PRE-CHARGE CONTROL OF VSI

(75) Inventors: John T. Streicher, Ixonia; Jeff Rivard, Wauwatosa, both of WI (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/670,645

(22) Filed: Sep. 27, 2000

(51) Int. Cl.$^7$ .................................. H02J 3/36; H02J 1/00
(52) U.S. Cl. .................................. 363/35; 363/95; 307/80
(58) Field of Search .................................. 363/34, 35, 37, 363/78, 95, 131; 307/54, 56, 57, 61, 63, 71, 72–76, 78, 80

(56) References Cited

U.S. PATENT DOCUMENTS 5,006,973 * 4/1991 Turner ..................................... 363/34
6,133,717 * 10/2000 Ng et al. ............................... 323/288
6,198,642 * 3/2001 Kociecki ................................. 363/37

* cited by examiner

Primary Examiner—Matthew Nguyen
(74) Attorney, Agent, or Firm—Michael A. Jaskolski; William R. Walbrun; Alexander M. Gerasimow

(57) ABSTRACT

A method and apparatus for automatically selecting and employing different DC link pre-charge levels dependent upon different sources providing power to a power conditioning system wherein the different sources are characterized by different source inductances, the apparatus including a source control that selects a first pre-charge level when a utility supply provides power to the system and selects a relatively lower pre-charge level when a generator supply provides power to the system thereby reducing the possibility of inverter disablement due to DC link voltage dips.

20 Claims, 3 Drawing Sheets

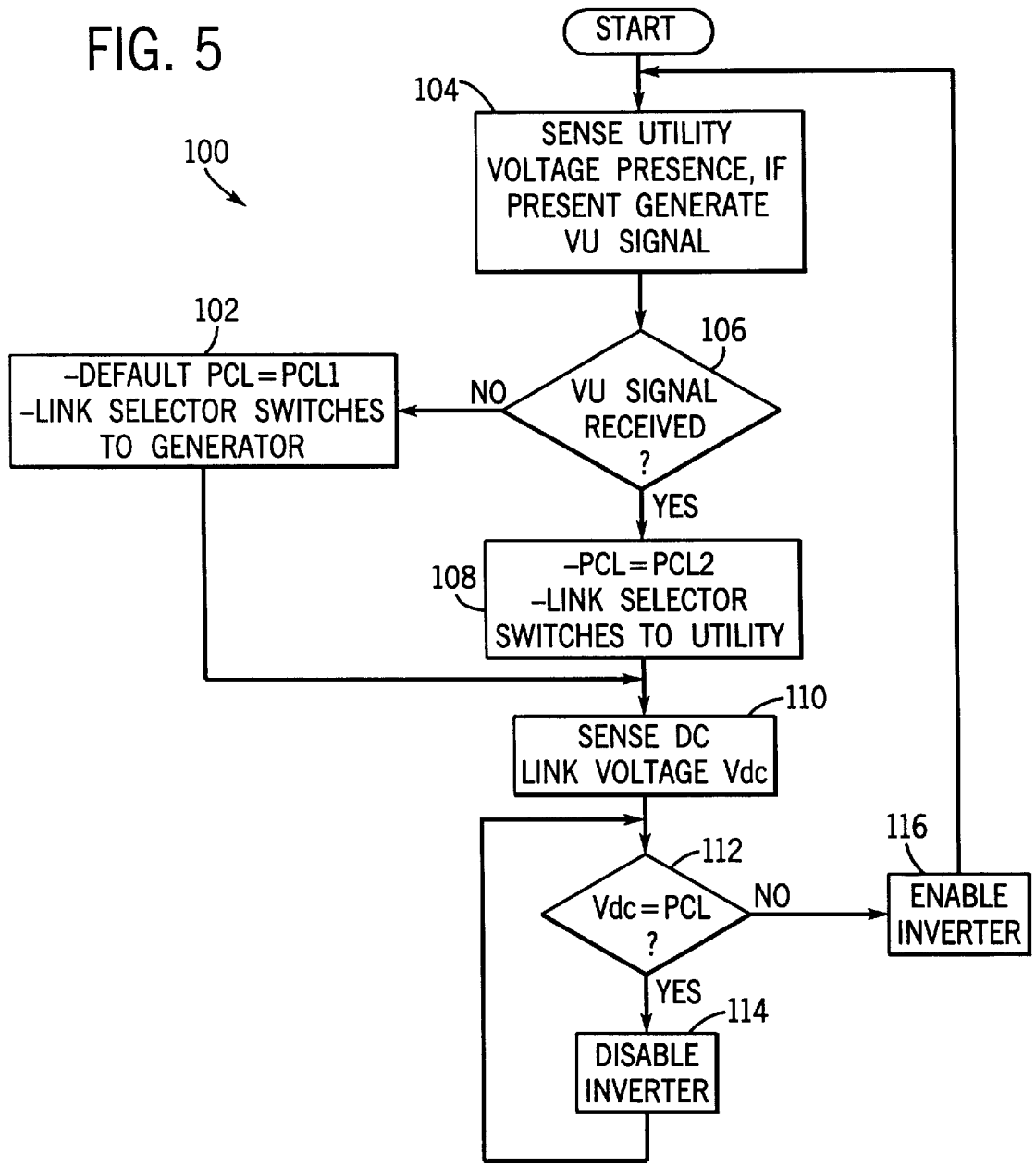

METHOD AND APPARATUS FOR PRE-CHARGE CONTROL OF VSI

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to power conditioning configurations and more specifically to a method and apparatus for modifying a pre-charge voltage on a DC link between a rectifier and an inverter where the rectifier may be fed by more than one source and at least two of the potential sources have disparate characteristic impedances.

Power plants are linked to power consuming facilities (e.g., buildings, factories, etc.) via utility grids designed so as to be extremely efficient in delivering massive amounts of power. To facilitate efficient distribution over long distances power is delivered as low frequency three phase AC current.

Despite being distributable efficiently, low frequency AC current is not suitable for end use in consuming facilities. Thus, prior to end use utility grid power has to be converted to a useable form. To this end a typical power "conditioning" configuration includes an AC-to-DC rectifier that converts the utility AC power to DC across positive and negative DC buses (i.e., across a DC link) and an inverter linked to the DC link that converts the DC power back to three phase AC power having an end useable form (e.g., three phase high frequency AC voltage). A controller controls the inverter in a manner calculated to provide the voltage waveforms required by the consuming facility.

While power plants are typically the most efficient way to provide massive amounts of power to consuming facilities, most consuming facilities are equipped with a backup power supply, typically a generator, to provide power to the facility when utility grid power is cut off. Generators, like power plants, provide three phase AC power to conditioning configurations.

A typical rectifier includes a diode or SCR bridge that, while rectifying AC power, causes a three phase 360 Hertz ripple across the DC bus. To filter out the ripple many conditioning configurations include a pre-charge component, typically a large bulk capacitor, linked between the positive and negative DC buses. Unfortunately, under certain circumstances the bulk capacitor can result in a current in-rush into the inverter that can damage the inverter. The magnitude of the current in-rush is a function of two factors. First, if the bulk capacitor is relatively uncharged the difference between a peak applied voltage and the DC bus voltage can be substantial, the potential difference tending to cause the current in-rush. Second, the in-rush magnitude is also a function of the AC source (e.g., the utility) impedance. Where source impedance is relatively large the in-rush is appreciably tempered and where source impedance is relatively small the in-rush is relatively large.

Because of the potentially damaging current in-rush, most conditioning configurations including a DC bus bulk capacitor also include a hardware protection mechanism to ensure that the bulk capacitor charge is always above a safe threshold or "pre-charge" level prior to causing the inverter to draw power from the DC bus. The protection mechanism may be as simple as a DC bus voltage sensor for sensing the bulk capacitor charge, a comparator to compare the bulk capacitor charge to the pre-charge level and a mechanism for causing the inverter controller to disable (i.e., opening inverter switches so the inverter does not draw power) the inverter when the bulk capacitor charge dips below the pre-charge level. Thus, upon start-up, the DC bus capacitor is pre-charged to the pre-charge level prior to power being drawn by the inverter. Similarly, during inverter operation if, for some reason, the capacitor charge dips below the pre-charge level, the inverter stops drawing power until the capacitor charge again exceeds the pre-charge level.

A typical impedance for a utility source is approximately a relatively low 1 to 3%. Given such a low impedance, a typical pre-charge level is approximately 85% of full bulk capacitor charge or full charge level (FCL). Thus, when the bulk capacitor charge falls below the 85% FCL, the inverter controller disables the inverter. While some conditioning configurations have an adjustable pre-charge level, each configuration requires that the pre-charge level be set to accommodate a specific source impedance.

While a utility source is typically characterized by a low impedance, most generators are characterized by relatively high impedances. For example, many generators have impedances that exceed 20%. Such high impedances often cause excessive distortion in AC supply voltage and current waveforms. Referring to FIG. 2 exemplary voltage and current waveforms V and I, respectively, corresponding to a generator source are illustrated. Waveforms V and I were generated by a generator feeding a six-pulse inverter drive under load. While a generator regulator can increase output to provide a desired RMS, the distorted waveforms can cause DC bus voltage dips.

In many cases, when the DC bus voltage dips below the pre-charge level, the dip causes pre-charge disablement of the inverter while the bus voltage is re-charged to the pre-charge level. Because pre-charge levels are set for efficient and safe operation assuming a utility source (e.g., 85% of full bulk capacitor charge), and generators often cause relatively large DC bus voltage distortion, switching from a utility source to a generator source often results in the DC bus voltage dropping below the specified pre-charge level and hence causes the controller to disable the inverter during pre-charge sessions.

One solution to the voltage dip problem caused by switching from a utility to a generator source is to provide a much larger generator (e.g., 3 to 4 times larger) to lower the source impedance to a level more similar to the utility source impedance. While adopted by several members of the industry this solution is relatively expensive and therefore is not suitable for all applications.

Another solution that can be adopted when the pre-charge level is manually adjustable is to adjust the pre-charge level manually to accommodate the generator's higher characteristic impedance. To optimally manually adjust the pre-charge level as a function of source and system characteristics a system user has to be knowledgeable about many system characteristics and inductive/electrical phenomenon. For example, to optimally tune the user has to be familiar with an expected peak source voltage, source impedance, inverter switch characteristics such as current handling capabilities and so on. In other words, the user has to be relatively highly skilled to effect optimum pre-charge tuning. While effective, manually adjustable systems are burdensome in most cases for several reasons. First, generators are primarily used as backup power sources and therefore are only sporadically employed. For this reason often no user at a consuming facility is familiar with the pre-charge level adjustment procedure and the source/system characteristics described above. Second, even when generators are employed the periods of employment are often limited as utility sources are typically only cut off for relatively short times. Thus, even if the pre-charge level could be manually adjusted at a consuming facility when a generator is employed, the manual adjustment task would likely be for naught when the utility source is back on line. In fact, in such a case, when the utility is back on line the pre-charge level would again have to be adjusted back to the level corresponding to the utility impedance.

Other solutions such as halting power consumption when a utility is down or simply allowing dips and pre-charge sessions when a generator source is employed are unacceptable in many applications where relatively constant power and inverter operation is required.

In addition to consuming facilities that are primarily powered by utility sources, some remote facilities are powered primarily by dedicated generator sources. In these cases the conditioning configurations that facilitate manual pre-charge level adjustment are advantageous as the pre-charge level can be set to accommodate specific generator characteristic impedance. Unfortunately, even in this case, the task of selecting the pre-charge level is burdensome and increases the time and costs associated with commissioning the conditioning configuration.

Therefore, a need exists for a low cost system that facilitates switching of power sources that feed conditioning configurations where the sources are characterized by different impedances without causing unnecessary inverter disablement. In addition, it would be advantageous to have a system that automatically selects a suitable pre-charge limit as a function of the source linked to the conditioning configuration.

BRIEF SUMMARY OF THE INVENTION

The present inventors have recognized that while the high impedance associated with a generator often causes excessive DC link distortion, the high impedance also impedes current in-rush into an inverter when the difference between a peak applied voltage and a DC bus voltage is large. For this reason, where a generator source is employed relatively larger DC voltage dips can be tolerated without risking in-rush current magnitudes that will damage an inverter. Thus, when a generator is employed instead of a utility source, the present invention automatically selects a lower pre-charge level for the DC link than the pre-charge level employed when a utility source provides power to the DC link. For example, when a utility source is initially linked to a conditioning configuration including a DC bus bulk capacitor and the utility source has a characteristic impedance of 1 to 3% a first suitable pre-charge level of 85% of full charge may be employed. Upon switching from the utility source to a generator source where the generator source has a characteristic source impedance of approximately 20%, a second suitable pre-charge level of between 15 and 50% is employed.

Thus, one object of the invention is to provide a conditioning configuration wherein unnecessary inverter disablement is substantially reduced. To this end, by providing two different pre-charge levels, a first relatively high level corresponding to a first source having a first characteristic impedance and a second relatively low level corresponding to a second source having a second characteristic impedance that is greater than the first characteristic impedance, when the sources are switched, in-rush current is maintained at safe levels while the number of pre-charge sessions is kept to a minimum.

One other object to achieve the aforementioned object relatively inexpensively. To this end the present invention can be implemented essentially using existing hardware and simply adding software instructions to be performed by a controller processor.

Another object is to provide a system where the pre-charge level is automatically set as a function of the source. To this end, one embodiment of the inventive system includes a controller input that is linkable to a utility source, the utility providing a signal at the input when the utility is providing power. When a signal is received at the input the controller sets the pre-charge level at a level suitable for a typical utility source (e.g., 85% of the normal DC link level). When no signal is provided at the input the controller sets the pre-charge level at a level suitable for a relatively high impedance generator (e.g., 60% of the normal DC link level).

Yet another object of the invention is to provide a system where a second pre-charge level for a specific generator can be optimally tuned once by a skilled system operator and thereafter, when the generator is linked either manually or automatically to provide power to the DC bus, the system uses the optimally tuned pre-charge level. It is contemplated that in the case of generators that provide redundant back-up power to utility sources, typically a single generator having specific characteristics (e.g., a specific known source inductance) will be employed and only rarely will the generator be replaced with another generator having different characteristics. In these cases, by storing optimally tuned pre-charge levels for both the utility and generator sources, the task of returning the pre-charge levels upon source switching is eliminated.

One more object is to, according to one embodiment of the invention, provide "hard-coded" first and second pre-charge levels corresponding to "worst case" sources of different types. For example, given all commercially available and mass produced generators there will be an expected lowest inductance generator. For instance, the generator having the expected lowest inductance may be characterized by a 10% inductance characteristic as opposed to a more typical 15–70% inductance characteristic. In the case of a 10% inductance generator, the pre-charge level deemed suitable to protect an inverter may be 75% of the normal DC link level. By hard-coding the utility source pre-charge level to 85% and the worst case generator's pre-charge level to 75%, a generic system to accommodate all generators is provided.

One further object is to restrict pre-charge level modifications by unskilled system users. Where pre-charge level is changeable by unskilled users, an unskilled user may set the pre-charge level below an inverter protecting level. for example, a user unfamiliar with a specific generator may believe that a maximum applied generator voltage is much lower than an actual maximum voltage and therefore may set the pre-charge level lower than suitable for protection purposes. By either hard-coding pre-charge levels for expected worst case source inductance or enabling optimal tuning by only skilled system users, suitable pre-charge levels can essentially be assured.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

BRIEF DESCRIPTION OF THE SEVERAL VIEWS OF THE DRAWINGS

FIG. 5 is a flow chart illustrating a method according to the present invention.

DETAILED DESCRIPTION OF THE INVENTION

Figure 1:
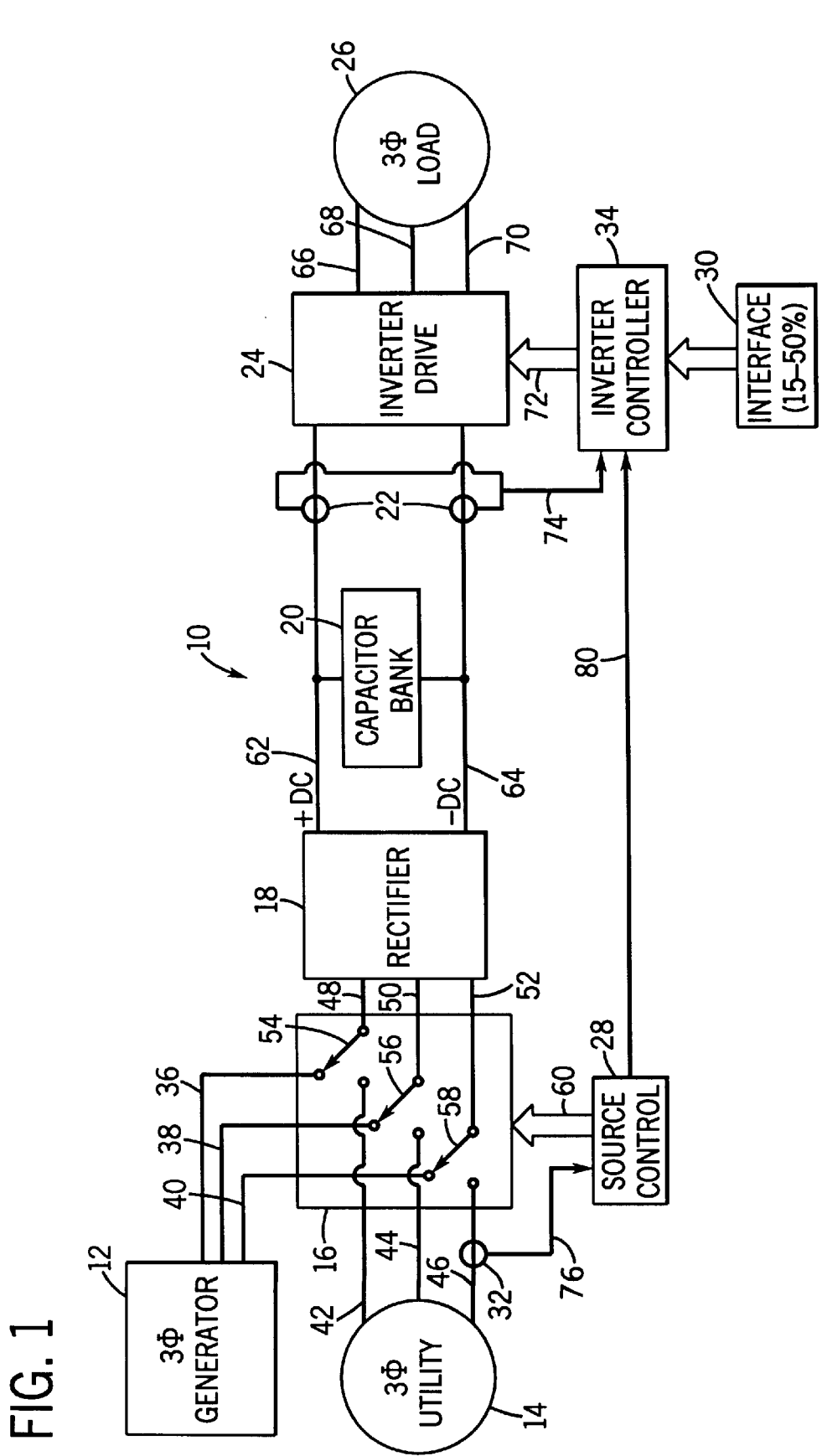
FIG. 1 is a schematic view the inventive system in the context of an exemplary motor control system according to the present invention.
Figure 2:
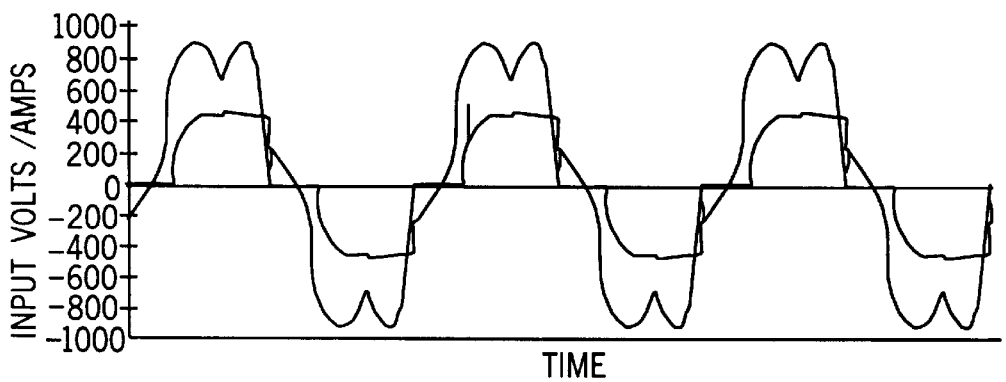
FIG. 2 is a graph illustrating voltage and current waveforms from a high impedance generator feeding a 6-pulse drive under load.

Referring now to the drawings wherein like reference characters correspond to similar components throughout the several views and, more specifically, referring to FIG. 1, the present invention will be described in the context in the exemplary motor control system 10. System 10 includes three-phase generator source 12, a three-phase utility source 14, a source selector 16, a rectifier 18, a capacitor bank 20, a DC link voltage sensor 22, an inverter drive 24, a three-phase load 26, a source control 28, an interface 30, a utility voltage sensor 32 and an inverter controller 34.

Selector 16 defines six inputs, first, second and third inputs linked to generator supply lines 36, 38 and 40 and fourth, fifth and sixth inputs linked to utility supply lines 42, 44 and 46, respectively. Selector 16 also includes three outputs linked via first, second and third output lines 48, 50 and 52 to three inputs of rectifier 18. In addition to the inputs and outputs, selector 16 includes three single pole double throw switches 54, 56 and 58. Switch 54 links output 48 to either first input line 36 or fourth input line 42, switch 56 links output line 50 to either second input line 38 or fifth input line 44 and switch 58 links output line 52 to either third input line 40 or sixth input line 46 such that each of switches 54, 56 and 58 is capable of linking a corresponding output line to either a generator input line or a utility input line. Switches 54, 56 and 58 are synchronized such all of the switches together select either generator input lines 36, 38 and 40 or utility input lines 42, 44 and 46.

A control bus 60 links source control 28 to each of switches 54, 56 and 58 so that control 28 controls the positions of each of switches 54, 56, and 58. Thus, selector 16 is used to select either three phase AC input from generator 12 or three-phase AC input from utility 14, providing the selected AC input voltages to rectifier 18 on output lines 48, 50 and 52.

Rectifier 18 receives the three-phase input voltages on lines 48, 50 and 52 and, as well known in the power conditioning industry, converts the three-phase voltages to a DC potential which is provided across positive and negative DC buses 62, 64, respectively. The DC buses 62 and 64 together are referred to herein as a DC link. A large bulk capacitor bank 20 is linked between buses 62 and 64 and is provided to reduce ripple on the DC link.

The DC link provides a DC voltage to inverter drive 24. Also as well known in the power conditioning industry, inverter drive 24 includes a plurality of switches which are configured and controlled so as to convert the DC voltage at the inverter inputs to three-phase AC output voltages on supply lines 66, 68 and 70. Each of lines 66, 68 and 70 is separately linked to one of three phase windings (not illustrated) of three-phase load 26. Operation of exemplary three-phase loads 26 such as motors are well known in the controls art and therefore will not be explained herein detail.

Inverter controller 34 is linked via a control bus 72 to the switches of inverter drive 24 to independently control the states (e.g., open, closed) of the drive switches in a manner calculated to provide desired voltage on output lines 66, 68 and 70. When the inverter switches are closed power is drawn from the DC link (i.e., buses 62 and 64) and delivered to load 26 thereby tending to reduce the energy on the DC link. When inverter switches are opened power is not drawn from the DC link and the energy provided by rectifier 18 increases the energy stored across the DC link.

Sensor 22 is linked to buses 62 and 64 and senses the voltage difference across the DC link. A signal indicative of voltage difference is provided to inverter controller 34 via a sensor line 74.

Referring still to FIG. 1 source sensor 32 senses the presence of a utility voltage on line 46 and provides a signal indicating the presence of utility voltage via a sensor line 76 to source control 28.

Source control 28 performs several functions according to the present invention. First, based on the presence of a signal on sensor line 76, source control 28 control switches 54, 56 and 58 to select either generator supply lines 36, 38 and 40 or utility supply lines 42, 44 and 46 to be linked to output lines 48, 50 and 52. In this regard, specifically, when a signal is not received via sensor line 76, source control 28 sends signals to switches 54, 56 and 58 via bus 60 causing switches 54, 56 and 58 to link generator input lines 36, 38 and 40 to output lines 48, 50 and 52, respectively. To this end, switches 54, 56 and 58 may be normally closed to generator source lines 36, 38 and 40 so that, when there is no signal on line 76, source control 28 does not provide signals to switches 54, 56 and 58 thereby allowing those switches to remain in their normally closed states. In this case, the absence of signals on bus 60 would in effect be signals indicating that the normally closed states of switches 54, 56 and 58 should be maintained. When a signal is provided on line 76 indicating that utility source 14 is linked to selector 54 and that voltage is being provided on line 46, source control 28 controls switches 54, 56 and 58 to close those switches to connect utility supply lines 42, 44 and 46 to output lines 48, 50 and 52, respectively.

In addition to providing control signals on bus 60, source control 28 also provides a signal via a line 80 to inverter controller 84 indicating which of utility 14 and generator 12 is linked to output lines 48, 50 and 52.

Inverter controller 34 also performs a plurality of functions. As indicated above, controller 34 controls the switches (not illustrated) of inverter drive 24 so as to provide three-phase AC voltages on lines 66, 68 and 70. In addition, controller 34 performs the protection function of disabling the inverter switches whenever the DC link voltage level drops below a pre-charge level corresponding to a pre-charge level deemed adequate to eliminate the possibility of an on-rush current into inverter drive 24. With respect to utility source 14, the predetermined pre-charge level in the exemplary system 10 will be assumed to be 85% of a normal DC link voltage level. Thus, when utility source 14 is linked to lines 48, 50 and 52 to provide voltage to rectifier 18, if the DC link voltage across buses 62, and 64 drops by 15%, inverter controller 34 disables inverter drive switches to allow the DC link voltage across capacitor 20 to recharge up to the desired DC link pre-charge level.

Where generator source 12 is linked to output lines 48, 50 and 52 to provide power to rectifier 18, inverter controller 34 is programmed employ a second relatively lower pre-charge level to protect inverter drive 24 switches. In one embodiment of the invention, the relatively lower pre-charge level corresponding to generator 12 is hard-coded into controller 34 and is selected to be a pre-charge level which will accommodate essentially all generators 12 independent of generator inductance corresponding to a specific generator type. In this case, the generator pre-charge level is selected so as to accommodate the lowest expected inductance corresponding to a generator 12. Thus, where the lowest expected generator inductance is 10%, the hard-coded pre-charge level corresponding to generator 12 may be selected to be a relatively high 75% of the normal DC link voltage.

In the alternative, the generator pre-charge level may be adjustable via interface 30 within a range corresponding to expected generator inductance levels. As illustrated in FIG. 1, an exemplary range of selectable generator pre-charge levels may be between 15% and 50%.

Referring now to FIGS. 1 and 5, in FIG. 5, an exemplary method 100 according to the present invention is illustrated. Method 100 is performed by source control 28 and inverter controller 34 and is generic in the sense that it is independent of whether or not the pre-charge level corresponding to generator 12 is hard-coded or manually adjustable, initially it is assumed that each of the generator pre-charge level PCL1 and the utility charge level PCL2 have been set.

For the purpose of this explanation it will be assumed that the pre-charge level PCL1 is 65% of the normal DC link voltage level. It will also be assumed that the utility suitable pre-charge level PCL2 is set to 85% of the normal DC link voltage level. In addition, this example it will be assumed that switches 54, 56 and 58 are normally closed such that lines 36, 38 and 40 are linked to lines 48, 50 and 52 and therefore, source control 28 "selects" generator 12 for linking to rectifier 18 by providing no signals on bus 60.

At process block 104 sensor 32 senses voltage on utility supply line 46 and, if a voltage is present on line 46, sensor 32 generates a signal $V_u$ on line 76 which is provided to source control 28. At decision block 106, source control 28 determines whether or not a voltage present signal $V_u$ has been received. If no voltage presence signal $V_u$ has been received, control passes to block 102 where control 28 provides no signal on line 80. When no signal is provided on line 80 controller 34 sets the pre-charge level PCL to PCL1 corresponding to the generator pre-charge level. In addition, at block 102 control 28 controls link selector 16 to select generator 12 as the source linked to output lines 48, 50 and 52. At block 106, if a signal $V_u$ is provided on line 76 indicating the presence of source 14 control passes to block 108 where control 28 provides a signal to controller 34 via line 80. When controller 34 receives a signal on line 80 controller 34 sets the pre-charge level PCL equal to the utility suitable charge level PCL2. In addition, at block 108 control 28 controls selector 16 to link utility 14 to output lines 48, 50 and 52.

Next, after each of blocks 102 and 108 control passes to block 110 where sensor 22 senses the DC link voltage $V_{DC}$ and provides a signal to inverter controller 34. At decision block 112, inverter controller 34 compares the sensed DC link voltage $V_{DC}$ to the set pre-charge level PCL. At block 106, assuming that there is no voltage on utility line 46, the pre-charge level PCL is equal to the generator pre-charge level of 65% of the normal DC link voltage. If the sensed DC link voltage is greater than 65% of the normal DC link voltage level at decision block 112, control passes to block 116 where controller 34 continues to enable inverter 24. In the alternative, if the sensed DC link voltage $V_{DC}$ is less than 65% of the normal DC link voltage control passes to block 114 and controller 34 disables inverter 24. The loop from block 112 through block 114 continues so that inverter 24 remains disabled until the sensed DC link voltage $V_{DC}$ is greater than the 65% pre-charge level at which point control passes to block 116 where controller 34 enables inverter 24.

Although not illustrated, it should be appreciated that the loop including blocks 112 and 144 may be hysteretic in the sense that, after inverter 24 has been disabled at block 114, the inverter 24 may not be re-enabled until a DC link voltage greater than the pre-charge level (e.g., greater than 65% in the present example) has been achieved so as to limit the disabling and enabling cycles that occur. Hysteretic loops are well known in the controls art and therefore will not be explained here in more detail.

Referring still to FIGS. 1 and 5 and specifically to again to block 106, as indicated above, if a voltage presence signal $V_u$ is received via line 76 indicating that utility source 14 is linked to selector 16 and that a voltage is being provided on line 46, controller 34 sets the pre-charge level PCL to the pre-charge level PCL2 corresponding to utility source 14. In the present example, it has been assumed that the utility source pre-charge level PCL2 is 85% and therefore, at block 108, the pre-charge level PCL is set equal to 85% of the normal DC link voltage.

Continuing, at block 110, sensor 22 again senses the DC link voltage $V_{DC}$ and provides a signal indicative thereof to controller 34 via line 74. Again, at block 112, controller 34 compares the sensed DC link voltage $V_{DC}$ to the pre-charge level PCL. In this case, because utility source 14 is linked to rectifier, the pre-charge level is 85% of the normal DC link voltage and therefore, when the sensed DC link voltage $V_{DC}$ drops below 85% of a normal DC link voltage, at block 114 inverter controller 34 disables inverter 24. Similarly, when the DC link voltage $V_{DC}$ is greater than the pre-charge level (i.e., in this case, greater than 85% of the normal DC link voltage), control passes to block 116 where inverter controller 34 enables inverter 24. As above, the loop including blocks 112 and 114 may be hysteretic.

After inverter 24 has been enabled at block 116, control again passes up to block 104 where process 100 continues.

Figure 3:
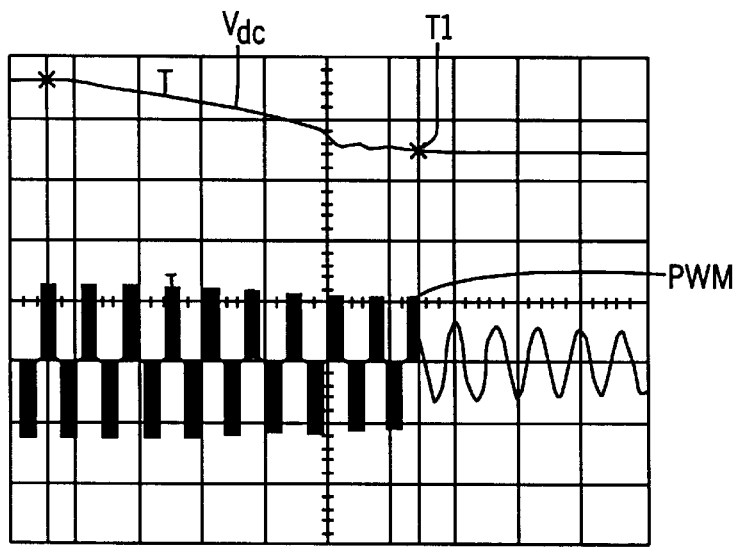
FIG. 3 is a graph illustrating DC bus voltage and inverter output with a pre-charge level set to 19%.

Referring now to FIG. 3, an exemplary DC link voltage $V_{DC}$ and an exemplary PWM voltage pulse waveform are illustrated where the source used to provide power to rectifier 18 (see FIG. 1) was a generator and the pre-charge level was set to 81% of the normal DC link voltage. In FIG. 3, the DC bus voltage $V_{DC}$ is shown on a scale of 100 volts per division and the PWM waveform PWM is shown on a scale of 500 volts per division. It can be see that at a time T1 controller 34 disables inverter 24. In-rush current into the inverter was not a problem given the pre-charge level and the generator inductance.

Figure 4:
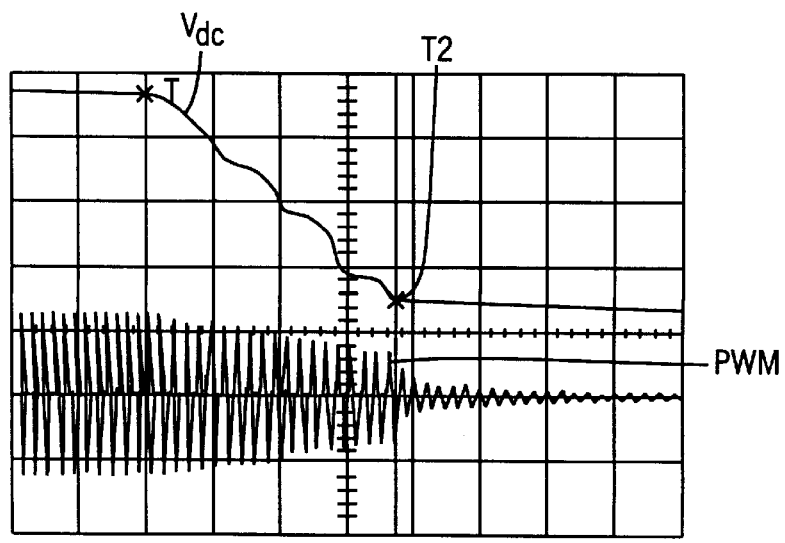
FIG. 4 is a graph similar to FIG. 3 albeit with the pre-charge level set to 50%.

Referring also to FIG. 4, FIG. 4 is similar to FIG. 3 in that it shows a DC link voltage waveform $V_{DC}$ and a PWM voltage waveform PWM. Scales for each of the waveforms in FIG. 4 are identical to the scales to the waveforms in FIG. 3. The difference between FIGS. 4 and 3 is that the pre-charge level in FIG. 4 was set to 50% of the normal DC link level and, as seen, inverter 24 is disabled at a time T2 after the DC link voltage $V_{DC}$ is dropped by 50%. Again, given the pre-charge level and the generator inductance no in-rush current problems were observed.

It should be understood that the methods and apparatuses described above are only exemplary and do not limit the scope of the invention, and that various modifications could be made by those skilled in the art that would fall under the scope of the invention.

To apprise the public of the scope of this invention, the following claims are made:

What is claimed is:

1. An apparatus for use with an AC voltage source generating an AC voltage, the source selected from one of a plurality of AC voltage sources, each source characterized by a source specific characteristic impedance, a converter and an inverter linked by positive and negative DC supply lines, a pre-charge component linking the supply lines and having a pre-charge voltage level, the apparatus for adjusting the pre-charge level as a function of the source and comprising:

a control module that correlates AC sources with source specific pre-charge levels, the module including a source identifier for identifying the source linked to the regulator and, based on which source is linked, indicating a specific pre-charge level;

a sensor for sensing the pre-charge component voltage;

a controller linked to the inverter to control the inverter, the controller receiving each of the specific pre-charge level and the pre-charge voltage and, when the pre-charge voltage is less than the pre-charge level, modifying inverter control until the pre-charge component charge increases to the pre-charge level.

2. The apparatus of claim 1 wherein the plurality of sources include a relatively high impedance source and a relatively low impedance source and corresponding high and low impedance pre-charge levels respectively and, wherein, the high impedance pre-charge level is lower than the low impedance pre-charge level.

3. The apparatus of claim 2 wherein the module includes an input linkable to the low impedance source, signal presence at the input indicating that the source is a low impedance source and lack of a signal at the input indicating that the source is the high impedance source, the source identifier identifying the source by identifying the presence or absence of a signal at the input.

4. The apparatus of claim 2 wherein the high impedance source is a generator and the low impedance source is a utility link and the low impedance pre-charge level is greater than 80 percent of a normal pre-charge component voltage and the high impedance pre-charge level is between 40 and 90 percent of the normal pre-charge component voltage.

5. The apparatus of claim 4 wherein the controller is an inverter controller and the apparatus is further for use with a source controller, the source controller controlling which of the utility link and the generator is linked to the rectifier and providing a signal indicating which source is linked, the identifier linked to the source control to receive the source indicating signal and identifying the source by examining the signal.

6. The apparatus of claim 4 wherein the low impedance pre-charge level is approximately 85 percent of the normal pre-charge component voltage and the high impedance pre-charge level is between 50 and 85 percent of the normal pre-charge component voltage.

7. The apparatus of claim 1 wherein the controller modifies by disabling the inverter until the pre-charge voltage exceeds the pre-charge level.

8. The apparatus of claim 1 further including an interface for adjusting at least one of the pre-charge levels corresponding to a relatively high impedance source to a level between 10 and 60 percent of a normal pre-charge component voltage.

9. An apparatus for use with an AC voltage source generating an AC voltage, the source selected from one of a plurality of AC voltage sources, each source characterized by a source specific characteristic impedance, a converter and an inverter linked together by positive and negative DC supply lines, a pre-charge component linking the supply lines together, the controller sensing the voltage across the pre-charge component and, when the pre-charge voltage is less than a pre-charge level, modifying inverter operation to charge the pre-charge component, the apparatus for adjusting the pre-charge level as a function of the source and comprising:

a control module that correlates AC sources with source specific pre-charge levels, the module including a source identifier for identifying the source linked to the regulator and, based on which source is linked, providing a specific pre-charge level to the controller wherein the provided pre-charge level indicates a safe pre-charge level given the linked source, the pre-charge level used by the controller to control the inverter.

10. The apparatus of claim 9 wherein the plurality of sources include a relatively high impedance source and a relatively low impedance source and corresponding high and low impedance pre-charge levels respectively and, wherein, the high impedance pre-charge level is lower than the low impedance pre-charge level.

11. The apparatus of claim 10 wherein the module includes an input linkable to the low impedance source, signal presence at the input indicating that the source is a low impedance source and lack of a signal at the input indicating that the source is the high impedance source, the source identifier identifying the source by identifying the presence or absence of a signal at the input.

12. The apparatus of claim 10 wherein the high impedance source is a generator and the low impedance source is a utility link, the pre-charge levels include a high impedance pre-charge level and a low impedance pre-charge level and the corresponding to the high and low impedance sources, respectively and the low impedance pre-charge level is greater than 80 percent of a normal pre-charge component voltage and the high impedance pre-charge level is between 30 and 90 percent of the normal pre-charge component voltage.

13. The apparatus of claim 9 wherein the controller modifies by disabling the inverter until the pre-charge voltage exceeds the pre-charge level.

14. A method for use with an AC voltage source generating an AC voltage, the source selected from one of a plurality of AC voltage sources, each source characterized by a source specific characteristic impedance, a converter and an inverter linked together by positive and negative DC supply lines, a pre-charge component linking the supply lines together, the controller sensing the voltage across the pre-charge component and, when the pre-charge voltage is less than a pre-charge level, modifying inverter operation to charge the pre-charge component, the method for adjusting the pre-charge level as a function of the source and comprising the steps of:

identifying the source linked to the regulator;

based on which source is linked to the regulator, providing a specific pre-charge level to the controller wherein the provided pre-charge level indicates a safe pre-charge level given the linked source; and using the pre-charge level to control the inverter.

15. The method of claim 14 wherein the plurality of sources include a relatively high impedance source and a relatively low impedance source and wherein the step of providing includes providing high and low impedance pre-charge levels corresponding to the high and low impedance sources, respectively, where the high impedance pre-charge level is lower than the low impedance pre-charge level.

16. The method of claim 15 wherein the high impedance source is a generator and the low impedance source is a utility link, and, wherein the low impedance pre-charge level is greater than 80 percent of a normal pre-charge component voltage and the high impedance pre-charge level is between 30 and 90 percent of the normal pre-charge component voltage.

17. The method of claim 9 wherein the step of using includes modifying inverter operation until the pre-charge voltage exceeds the pre-charge level.

18. The method of claim 17 wherein the step of modifying includes disabling the inverter.

19. The method of claim 11 wherein the high impedance source is a generator and the low impedance source is a utility link and the pre-charge level corresponding to the high impedance source is between 50 and 85 percent while the pre-charge level corresponding to the low impedance source is essentially 85 percent.

20. An apparatus for use with an AC voltage source generating an AC voltage, the source selected from one of a plurality of AC voltage sources, each source characterized by a source specific characteristic impedance, a converter for converting the AC voltage to DC voltage on a DC bus, a DC bus pre-charge component linked to the DC bus, an inverter linked to the DC bus for converting the DC voltage to AC voltage and a controller for controlling the inverter, the pre-charge component having to be pre-charged to a pre-charge level prior to providing power to the inverter, the pre-charge level dependent upon the source impedance, the controller sensing the voltage across the pre-charge component and, when the pre-charge voltage is less than the pre-charge level, disabling the inverter to charge the pre-charge component, the apparatus for adjusting the pre-charge level as a function of the source, the apparatus comprising:

a control module that correlates AC sources with source specific pre-charge levels, the module including a source identifier for identifying the source linked to the regulator and, based on which source is linked, providing a specific pre-charge level to the controller wherein the provided pre-charge level indicates a safe pre-charge level given the linked source, the pre-charge level used by the controller to control the inverter.

* * * * *